(12) United States Patent
Matsui et al.

(10) Patent No.: US 10,289,543 B2
(45) Date of Patent: May 14, 2019

(54) SECURE ERASURE OF PROCESSED DATA IN NON-VOLATILE MEMORY BY DISABLING DISTRIBUTED WRITING

(71) Applicant: CANON KABUSHIKI KAISHA, Tokyo (JP)

(72) Inventors: Keisuke Matsui, Tokyo (JP); Nobuhiro Tagashira, Sagamihara (JP); Kazuya Kishi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 233 days.

(21) Appl. No.: 14/685,469

(22) Filed: Apr. 13, 2015

(65) Prior Publication Data

US 2015/0301936 A1  Oct. 22, 2015

(30) Foreign Application Priority Data

Apr. 16, 2014 (JP) ................. 2014-084718

(51) Int. Cl.
| | | |
|---|---|---|
| *G06F 12/02* | (2006.01) | |
| *G06F 3/06* | (2006.01) | |
| *G06F 3/12* | (2006.01) | |
| *G06F 21/60* | (2013.01) | |

(52) U.S. Cl.
CPC ........ *G06F 12/0246* (2013.01); *G06F 3/0652* (2013.01); *G06F 3/1274* (2013.01); *G06F 21/608* (2013.01); *G06F 2212/7201* (2013.01)

(58) Field of Classification Search
CPC ......... G06F 12/0246; G06F 2212/7201; G06F 17/30117; G06F 2221/2143; G06F 3/0652
See application file for complete search history.

(56) References Cited

U.S. PATENT DOCUMENTS

| | | | | |
|---|---|---|---|---|
| 8,825,940 | B1 * | 9/2014 | Diggs | G06F 13/28 711/103 |
| 2006/0077420 | A1 * | 4/2006 | Okamoto | H04N 1/00 358/1.14 |
| 2007/0109586 | A1 * | 5/2007 | Yamada | G06F 3/121 358/1.14 |
| 2008/0016000 | A1 * | 1/2008 | Bramhill | G06F 21/10 705/57 |
| 2008/0263675 | A1 * | 10/2008 | McIntyre | G06F 21/608 726/28 |
| 2009/0219562 | A1 * | 9/2009 | Hasegawa | H04N 1/00204 358/1.15 |
| 2009/0316209 | A1 * | 12/2009 | Akiyama | H04N 1/2166 358/1.16 |
| 2010/0250835 | A1 * | 9/2010 | Paddon | G06F 21/79 711/103 |
| 2011/0154060 | A1 * | 6/2011 | Guyot | G06F 12/1425 713/193 |

(Continued)

FOREIGN PATENT DOCUMENTS

| | | |
|---|---|---|
| JP | 2012-018501 A | 1/2012 |
| JP | 2012-191370 A | 10/2012 |

*Primary Examiner* — Rocio Del Mar Perez-Velez
(74) *Attorney, Agent, or Firm* — Canon U.S.A., Inc. I.P. Division

(57) ABSTRACT

An information processing apparatus which stores process target data in a non-volatile memory, cancels a writing distribution function with respect to the non-volatile memory according to a job input to the information processing apparatus or a mode of the information processing apparatus, and can efficiently perform overwrite erasure.

16 Claims, 14 Drawing Sheets

(56) References Cited

U.S. PATENT DOCUMENTS

| | | | |
|---|---|---|---|
| 2011/0320733 A1* | 12/2011 | Sanford | G06F 12/0871 |
| | | | 711/135 |
| 2013/0124785 A1* | 5/2013 | Xiong | G06F 12/0246 |
| | | | 711/103 |
| 2014/0006689 A1* | 1/2014 | Hashimoto | G06F 12/0246 |
| | | | 711/103 |
| 2014/0022849 A1* | 1/2014 | Krutzik | G06F 21/80 |
| | | | 365/185.33 |
| 2014/0201473 A1* | 7/2014 | Falanga | G06F 12/0246 |
| | | | 711/154 |
| 2015/0193350 A1* | 7/2015 | Zhu | G06F 3/0608 |
| | | | 711/129 |
| 2015/0331620 A1* | 11/2015 | Hohnke | G06F 21/78 |
| | | | 711/103 |

\* cited by examiner

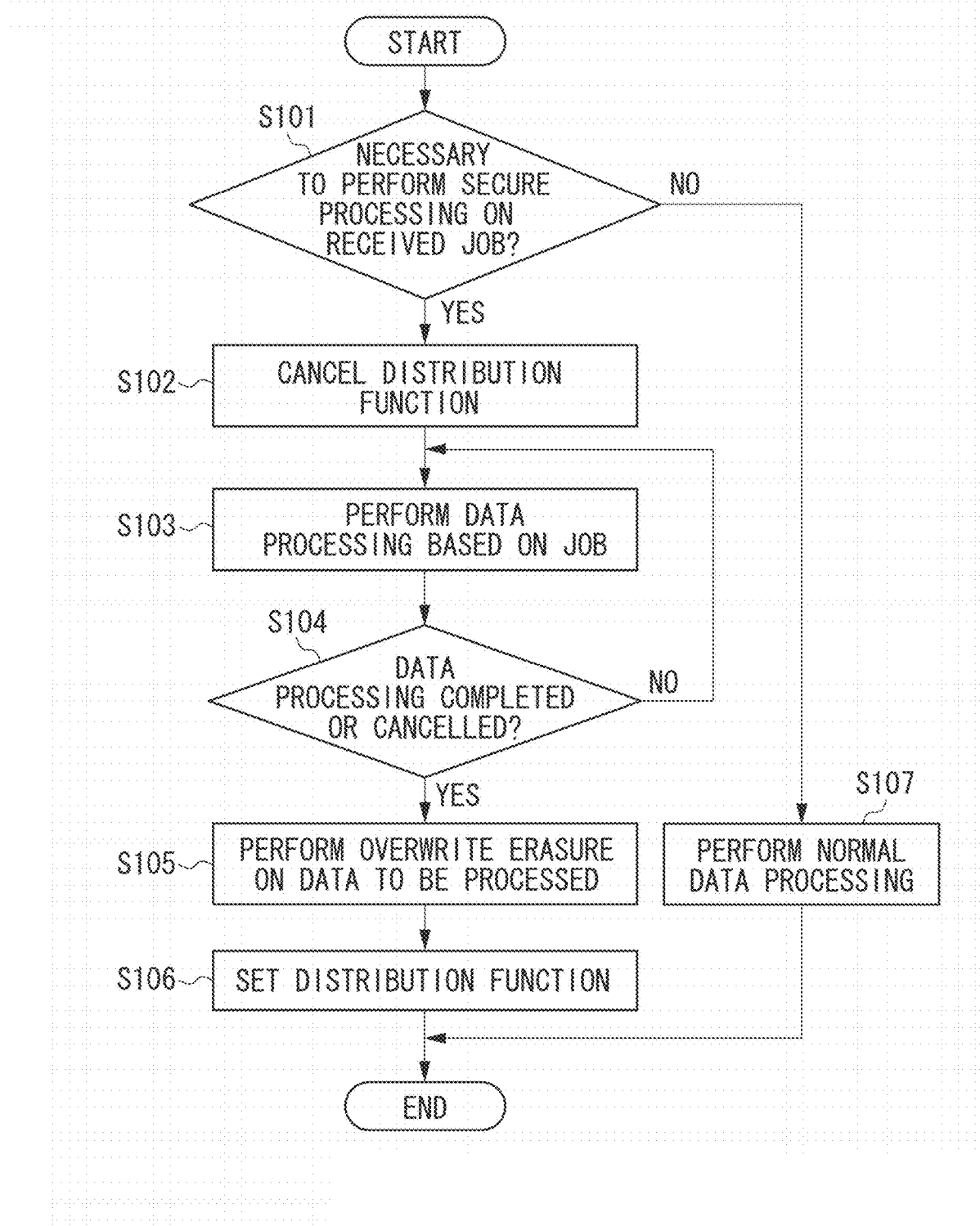

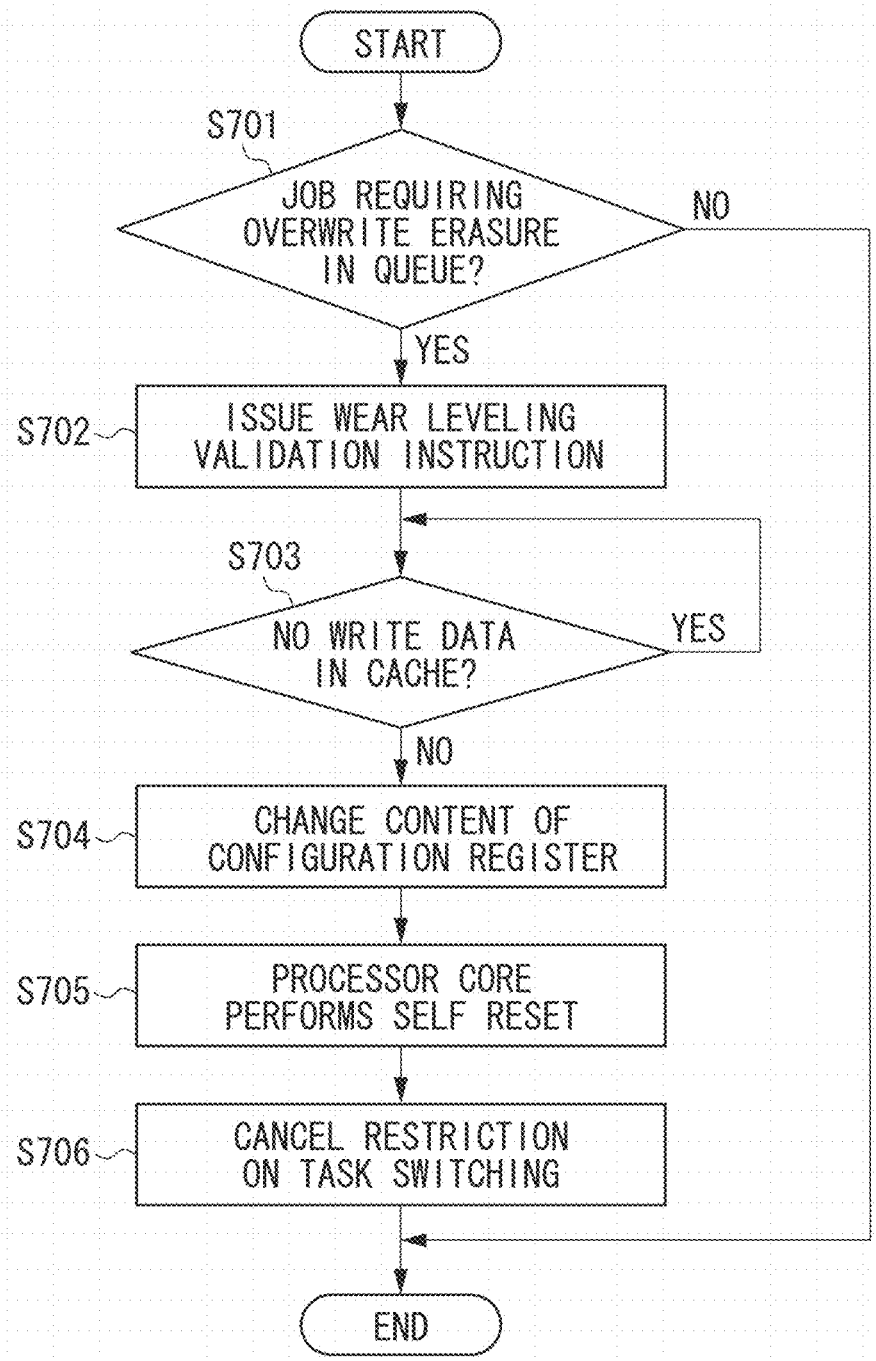

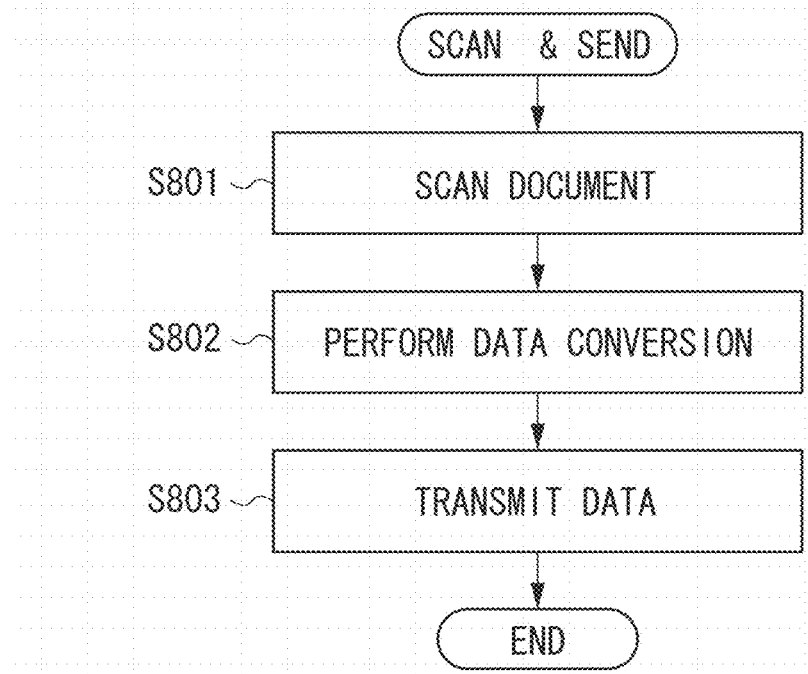

FIG. 10A

| DOCUMENT NAME | PRINT SETTING | NUMBER OF PAGES/COPIES | SIZE | COMPLETE ERASURE |
|---|---|---|---|---|
| ☐ Document_001.pdf | MONOCHROME A4 TWO-SIDED 1in1 | 30 PAGES, 1 COPY | 1.2MB | ✗ |
| ☐ Document_002.pdf | MONOCHROME A4 TWO-SIDED 1in1 | 3 PAGES, 1 COPY | 0.2MB | ✗ |
| ☐ Document_003.pdf | COLOR A4 ONE-SIDED 2in1 | 10 PAGES, 5 COPIES | 1.0MB | ✗ |
| ☑ Document_004.pdf | MONOCHROME A4 TWO-SIDED 1in1 | 80 PAGES, 1 COPY | 2.0MB | ✗ |

[ CANCEL ]  [ DELETE ]  [ START PRINTING ]

FIG. 10B

| DOCUMENT NAME | PRINT SETTING | NUMBER OF PAGES/COPIES | SIZE | COMPLETE ERASURE |
|---|---|---|---|---|
| ☐ Document_001.pdf | MONOCHROME A4 TWO-SIDED 1in1 | 30 PAGES, 1 COPY | 1.2MB | ✕ |
| ☐ Document_002.pdf | MONOCHROME A4 TWO-SIDED 1in1 | 3 PAGES, 1 COPY | 0.2MB | ✕ |
| ☐ Document_003.pdf | COLOR A4 ONE-SIDED 2in1 | 10 PAGES, 5 COPIES | 1.0MB | ✕ |
| ☐ Document_004.pdf | MONOCHROME A4 TWO-SIDED 1in1 | 80 PAGES, 1 COPY | 2.0MB | ✕ 1001 |

1002

[ CANCEL ]  [ DELETE ]  [ START PRINTING ]

SECURE ERASURE OF PROCESSED DATA IN NON-VOLATILE MEMORY BY DISABLING DISTRIBUTED WRITING

BACKGROUND OF THE INVENTION

Field of the Invention

The present invention relates to an information processing apparatus, an information processing terminal, an information processing method, and a program.

Description of the Related Art

There is a technique employed in an information processing apparatus such as a printer for preventing highly-confidential print data from being collected by other users. More specifically, the technique overwrites and erases the print data remaining in the information processing apparatus using a fixed value or a random value.

However, it is difficult to overwrite and erase the data in a solid state drive (SSD) which is increasingly used in place of a hard disk drive (HDD), for the following reason. The SSD uses a NAND type flash memory as a memory element. If a writing number of times of the memory element reaches longevity of the memory element, the memory element becomes unusable, so that writing is distributed to prevent concentration of writing. One method for distributing the writing is changing a correspondence between an address (i.e. a logic address) for accessing the SSD and a physical address of the SSD. It thus becomes difficult for the information processing apparatus using the SSD as a high capacity storage device to overwrite and erase the print data with a value for overwriting the print data after printing, due to a writing distribution function of the SSD.

Japanese Patent Application Laid-Open No. 2012-018501 discusses encrypting and then writing in the SSD the data to be processed, and erasing an encryption key after processing has been completed. Further, Japanese Patent Application Laid-Open No. 2012-191370 discusses processing for recording the data to be erased on memory instead of recording the data on the SSD.

As described above, if the data in the SSD is to be overwritten, the data cannot be securely overwritten due to the writing distribution function such as a wear leveling function. On the other hand, if the writing distribution function is not employed, the writing becomes concentrated and the longevity of the SSD becomes extremely short.

Further, according to the technique discussed in Japanese Patent Application Laid-Open No. 2012-018501, the encrypted data stored in the SSD continues to remain. In such a case, considering that encryption protocol may be analyzed in the future, reliability is not as high as compared to performing overwrite erasure. Furthermore, if performance of the technique discussed in Japanese Patent Application Laid-Open No. 2012-191370 is to be of the same level as when performing processing on the SSD, it becomes necessary to increase the size of the memory and adopt, for example, a synchronous dynamic random access memory (SDRAM). In such a case, cost performance becomes low.

SUMMARY OF THE INVENTION

According to an aspect of the present invention, an information processing apparatus which stores process target data in a non-volatile memory includes a control unit configured to change, based on a received job, a setting of a function of distributing writing on the non-volatile memory, a processing unit configured to process, based on the job, data stored in the non-volatile memory, and an erasure unit configured to perform, based on a processing state of the job processed by the processing unit, erasure processing by writing a predetermined value in an area storing data related to the job.

Further features of the present invention will become apparent from the following description of exemplary embodiments with reference to the attached drawings.

BRIEF DESCRIPTION OF THE DRAWINGS

FIG. 1 is a flowchart illustrating a process for changing the setting of the distribution function in the information processing apparatus.

FIG. 7 is a flowchart illustrating a process for setting the distribution function.

FIG. 8 is a flowchart illustrating a process for converting and outputting scanned data.

FIGS. 10A and 10B are schematic diagrams illustrating the UI for performing printing.

DESCRIPTION OF THE EMBODIMENTS

A first exemplary embodiment according to the present invention will be described below with reference to the drawings. A hardware configuration according to the first exemplary embodiment will be described below with reference to FIGS. 2A and 2B.

Figure 2A:
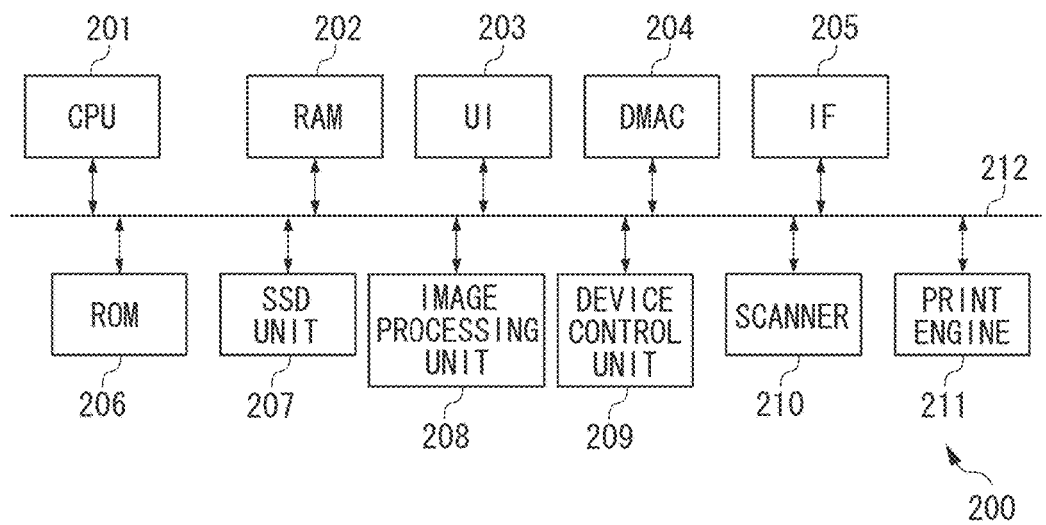
FIGS. 2A and 2B are schematic diagrams illustrating configurations of the information processing apparatus and a SSD unit respectively.

FIG. 2A is a schematic diagram illustrating the configuration of an information processing apparatus 200 to which the present invention is applicable. Referring to FIG. 2A, a read-only memory (ROM) 206 stores the programs for realizing the processes illustrated in the flowcharts to be described below. A central processing unit (CPU) 201 uses a direct memory access controller (DMAC) 204 for expanding the programs stored in the ROM 206 on a RAM 202, reading the programs from the RAM 202, and performing the processes including the contents of the flowcharts to be described below. The RAM 202 may include the SDRAM meeting a standard such as Double Data Rate (DDR) SDRAM.

A user uses a UI 203 for operating the information processing apparatus 200 and using various functions thereof. The UI 203 may include a plurality of buttons, a display device, and a touch panel. An interface (IF) 205 includes wired and wireless interfaces and external interfaces such as a universal serial bus (USB) and peripheral component interconnect express (PCIe). A SSD unit 207 is the high-capacity storage device including the non-volatile storage device such as the SSD which will be described in detail below. An image processing unit 208 performs various types of image processing according to a request from the CPU 201. A scanner 210 includes a line sensor and obtains a scanned image data from a document placed on a document plate or an automatic document feeding device (ADF) (not illustrated). A print engine 211 employs various types of image forming methods such as an inkjet method and an electrophotographic method. A bus 212 connects the units to enable communication with each other. A device control unit 209 includes a chip set for controlling exchange of data between the CPU 201 and the above-described units.

When the user uses a copy function of the information processing unit 200, the user places the document so that the scanner 210 can read the document. The scanner 210 then scans the document and stores the obtained scan image data in the RAM 202. The DMAC 204 transfers, based on the instruction from the CPU 201, the scan image data stored in the RAM 202 to the image processing unit 208 which converts the scan image data to image data to be printed. The image processing unit 208 performs processing such as shading processing, color space conversion processing (from red, green and blue (RGB) color space to cyan, magenta, yellow, and black (CMYK) color space), and gamma correction processing on the scan image data.

The DMAC 204 then transfers the scan image data, i.e., the print image data, which has been subjected to image-processing by the image processing unit 208, to the SSD unit 207. The print image data is stored in the SSD unit 207. If a predetermined amount of the print image data is accumulated in the SSD unit 207, the DMAC 204 transfers the print image data to the print engine 211, and the print engine 211 prints an image on a recording medium based on the print image data.

Figure 2B:
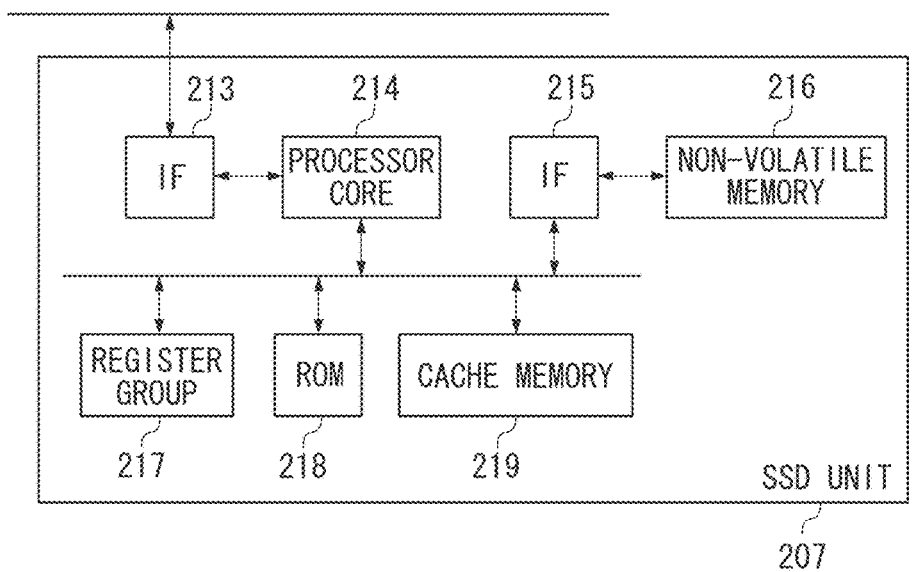

FIG. 2B is a schematic diagram illustrating in detail the configuration of the SSD unit 207. Referring to FIG. 2B, a non-volatile memory 216 includes the NAND type flash memory (hereinafter simply referred to as a flash memory) and is capable of storing the information in a non-volatile manner even when a charge is not supplied thereto. According to the present exemplary embodiment, the flash memory performs reading and writing in page units including a plurality of memory units and performs erasing in block units of which a plurality of pages corresponds to one unit. A ROM 218 stores the programs for controlling the SSD unit 207, and a processor core 214 reads and executes the programs. For example, the ROM 218 stores the program for realizing the writing distribution function (e.g., the wear leveling function) and a portion of the program for realizing self-monitoring analysis and reporting technology (S.M.A.R.T, hereinafter referred to as SMART) to be described in detail below.

A representative method used in the wear leveling is as follows. A table is provided for converting the address (i.e., the logical address) designated from outside the SSD unit 207 to the address (i.e., the physical address) for actually accessing the non-volatile memory 216. The correspondence between the logical address and the physical address in the conversion table is then changed for a rewriting operation to be actually performed on the memory element of low writing frequency.

A register group 217 includes the configuration register and a general-purpose register. The general-purpose register stores an intermediate value calculated by the processor core 214. The configuration register functions as a setting storing unit for storing the settings (i.e., parameters) to be used by the processor core 214 to control the SSD unit 207. The parameters will be described in detail below. An IF 213 connects the bus 212 to the processor core 214. For example, the IF 213 interprets the information transmitted via the bus 212 and transmits the result to the processor core 214. A cache memory 219 which includes a static RAM (SRAM) and the DRAM, temporarily stores the data to be written in and to be read from the non-volatile memory 216.

An IF 215 includes a controller for controlling the flash memory in the non-volatile memory 216 and performs various processes such as reading from and writing on the flash memory in the non-volatile memory 216 based on the instruction from the processor core 214. More specifically, the IF 215 includes an address register for storing the address of the non-volatile memory 216 to be accessed according to an access instruction from the processor core 214 and a command register for storing a command indicating access content. The IF 215 thus controls the non-volatile memory 216 according to the contents stored in the address register and the command register.

The functional configuration of the information processing apparatus 200 when performing printing will be described below with reference to FIG. 4.

Figure 4:
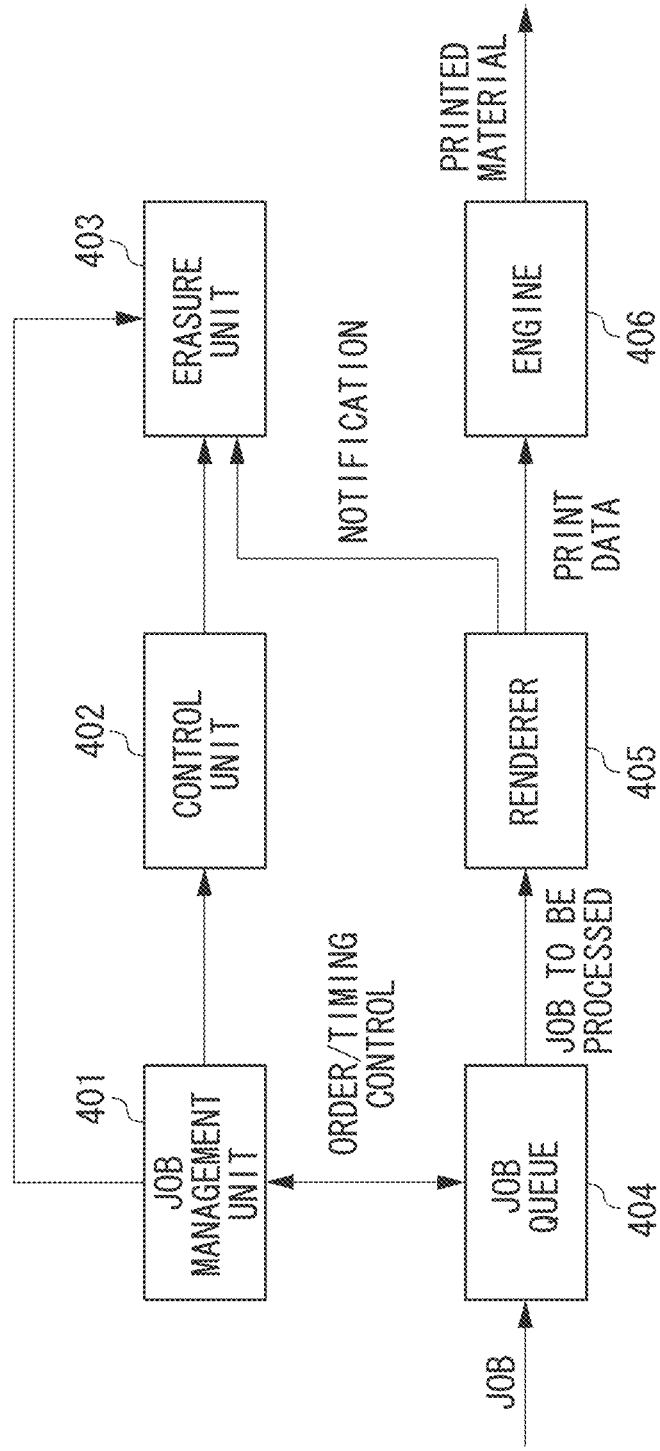
FIG. 4 is a schematic diagram illustrating a functional configuration for realizing a print function.

Referring to FIG. 4, a job management unit 401, a control unit 302, an erasure unit 403, and a job queue 404 are realized by the CPU 201 executing the programs stored in the RAM 202. A renderer 405 is realized by the CPU 201 and the image processing unit 208. According to the present exemplary embodiment, the job queue 404 and the renderer 405 use storage areas of the RAM 202 and the SSD unit 208. An engine 406 is realized by the print engine 211. Further, a job includes the information defining processing content of the information processing apparatus 200 and the information for identifying the data to be processed (or the data to be processed itself). The information for identifying the data to be processed is the information indicating a storage location of the data to be processed (i.e., link information) or index information (i.e., identification information) related to the data to be processed.

When printing is to be performed, the user uses the UI 203 or an external device such as the user terminal and issues the job defining the content of the process to be performed by the information processing apparatus 200. The job is spooled in the job queue (i.e., spooler) 404 in the information processing apparatus 200. An order and timing of processing one or more jobs stored in the job queue 404 are controlled by the job management unit 401. For example, user authentication of the job issued from the user terminal is performed on the UI 203 of the information processing apparatus 200. When the job management unit 401 confirms that the user has been authenticated, the user authenticated job is transmitted to the renderer (i.e., a rendering unit) 405 as the job to be processed in priority over other jobs. The operations of the job management unit 401, the control unit 402, and the erasure unit 403 will be described in detail below.

The renderer 405 converts the data of the job to be processed, into the print data appropriate for the print engine 211 and transmits the converted data to the engine 406. According to the present exemplary embodiment, the data of the job to be processed is text data and the image data. The print data appropriate for the print engine 211 is the data corresponding to a color material to be used in the print engine 211 and CMYK bit map data. The engine 406 uses the print engine 211 and outputs a printed material based on the print data.

The operation of the information processing apparatus 200 according to the present exemplary embodiment will be described below with reference to FIG. 1. FIG. 1 is a flowchart illustrating the process performed by the information processing apparatus 200 for changing the setting of the distribution function according to the job.

In step S101, the job management unit 401 determines, based on a job type and user information, whether the job received in the job queue 404 by the job management unit 401 requires secure processing. According to the present exemplary embodiment, the job requiring secure processing is a job in which it is undesirable to reuse the processing target data after being processed. For example, after the user prints confidential information and printing is completed (or cancelled), it is undesirable for the confidential information to be left in the information processing apparatus 200 unintentionally.

If the job management unit 401 determines that the received job requires secure processing (YES in step S101), the process proceeds to step S102. In step S102, the control unit 402 cancels the function of distributing the writing (hereinafter referred to as the distribution function) on the SSD unit 207. The process for cancelling the distribution function will be described in detail below.

In step S103, the job management unit 401 transmits the job requiring secure processing, to the renderer 405 as the job to be processed in priority. The renderer 405 then performs data processing based on the job (i.e., the process for converting the job to the print data according to the example illustrated in FIG. 4). In step S104, it is determined whether the renderer 405 has completed performing data processing or the job management unit 401 has detected that the process has been cancelled. According to the example illustrated in FIG. 4, the data processing is completed when the renderer 405 outputs the print data to the engine unit 406, and the renderer 405 then issues a notification to the erasure unit 403. If it is determined that the renderer 405 has not completed performing data processing or the job management unit 401 has not detected that the process has been cancelled (NO in step S104), the process returns to step S103.

If it is determined that the renderer 405 has completed performing data processing or the job management unit 401 has detected that the process has been cancelled (YES in step S104), the process proceeds to step S105. In step S105, the erasure unit 403 overwrites using a predetermined value (i.e., zero, the fixed value, or the random value) and erases in priority the data which has been stored in the non-volatile storage area among the data handled in the job requiring secure processing. Before performing the overwrite erasure, the job management unit 401 notifies the erasure unit 403 of the location of the data included in the job being spooled in the job queue 404. Further, the renderer 405 notifies the erasure unit 403 of the location the converted print data has been stored, and the erasure unit 403 then overwrites and erases the notified data. According to the present exemplary embodiment, the erasure unit 403 overwrites the notified data in the state where the distribution function has been cancelled, so that the overwrite erasure can be performed as desired. More specifically, since it is difficult to overwrite in units of elements on the NAND type flash memory, if the data is to be actually overwritten, it is necessary to erase the data (i.e., perform block erasure or secure erase) before overwriting the data. According to the present exemplary embodiment, the "overwrite erasure" indicates indirectly overwriting and erasing by writing a predetermined value on the same physical address (i.e., the physical address corresponding to the page).

When the erasure unit 403 completes the overwrite processing on the notified data, the process proceeds to step S106. In step S106, the control unit 402 resets the distribution function which has been cancelled in step S102. The process for setting the distribution function will be described in detail below.

If the job management unit 401 determines that the received job does not require secure processing (NO in step S101), the control unit 402 does not change the setting of the distribution function, and the process proceeds to step S107. In step S107, the renderer 405 performs normal data processing. According to the present exemplary embodiment, only the functional configuration of the printing process is illustrated for ease of description. However, the configuration illustrated in FIG. 4 may be provided for each function and be performed in parallel.

<The Process for Changing the Setting of the Distribution Function>

The process performed by the control unit 402 for changing the setting of the distribution function will be described below with reference to the flowcharts illustrated in FIGS. 5 and 7.

Figure 5:
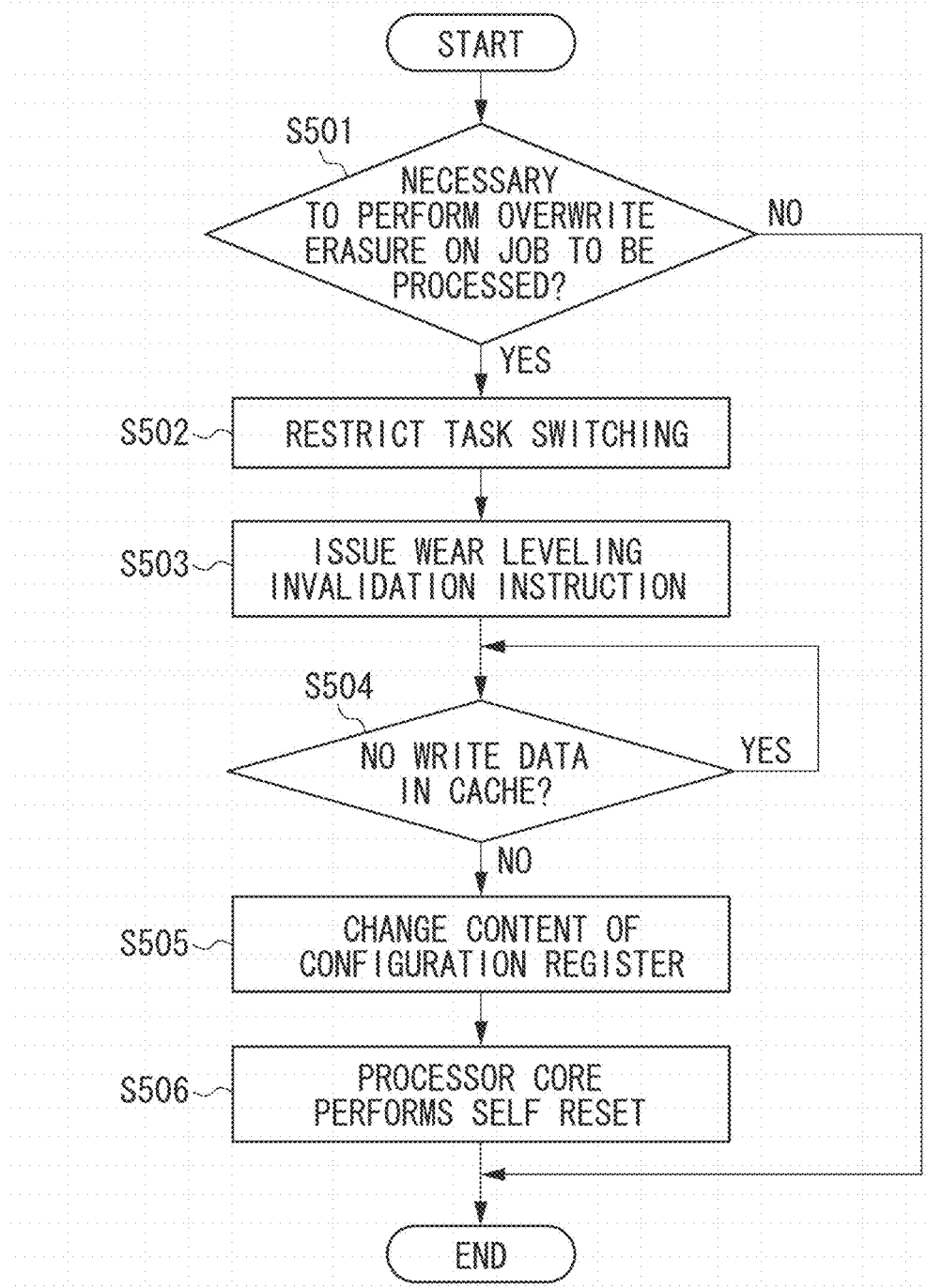
FIG. 5 is a flowchart illustrating a process for cancelling the distribution function.

FIG. 5 is a flowchart illustrating in detail the process performed by the control unit 402 for cancelling the distribution function in step S102 of the flowchart illustrated in FIG. 1. In step S501, the control unit 402 determines whether the instruction to overwrite and erase the data related to the job to be processed has been received from the job management unit 401. If the instruction has been received (YES in step S501), the process proceeds to step S502. In step S502, the control unit 402 restricts task switching, i.e., switching to a task is restricted other than the task necessary for performing the job requiring secure processing. As a result, execution of the job requiring secure processing is prioritized.

In step S503, the control unit 402 issues an instruction to the CPU 201 to cancel (i.e., invalidate) the distribution function (the wear leveling will be described as an example below) with respect to the SSD unit 207. In step S504, the processor core 214 in the SSD unit 207 stands by until there is no write data present in the cache memory 219, to prevent distribution protocol from changing while writing in the non-volatile memory 216 and thus a failure from occurring. If it is determined that there is no write data in the cache memory 219 (NO in step S504), the process proceeds to step S505.

In step S505, the processor core 214 changes the content of the configuration register in the register group 217. The change in the content of the configuration register will be described in detail below.

In step S506, the processor core 214 executes self reset and clears the parameters read therein. After recovering from self reset, the processor core 214 controls each component in the SSD unit 207 according to the changed content of the configuration register.

FIG. 7 is a flowchart illustrating the process performed by the control unit 402 for setting the distribution function in step S106 of the flowchart illustrated in FIG. 1.

In step S701, the job management unit 401 determines whether there is a job requiring the overwrite erasure to be performed in the job queue 404.

If the job management unit 401 determines that there is no job requiring the overwrite erasure to be performed in the job queue 404 (NO in step S701), the process proceeds to step S702. In step S702, the control unit 402 issues an instruction to the CPU 201 to set (i.e., validate) the distribution function with respect to the SSD unit 207. According to the present exemplary embodiment, the distribution function is the wear leveling.

In step S703, the processor core 214 in the SSD unit 207 stands by until there is no write data present in the cache 219. If it is determined that there is no write data in the cache 219 (NO in step S703), the process proceeds to step S704. In step S704, the processor core 214 changes the content of the configuration register in the register group 217. The change in the content of the configuration register will be described in detail below.

In step S705, the processor core 214 executes self reset. After recovering from self reset, the processor core 214 controls each component in the SSD unit 207 according to the content of the configuration register changed in step S704.

In step S706, the control unit 402 cancels the restriction on task switching set in step S502.

If the job management unit 401 determines that there is at least one job requiring the overwrite erasure to be performed in the job queue 404 (YES in step S701), the job management unit 401 withholds issuing the instruction for enabling the wear leveling until the job to be subsequently executed is determined, for the following reason. If the subsequent job to be executed requires overwrite erasure, the frequency of changing the setting of the distribution function can then be reduced. However, the process of step S701 may be removed so that the distribution function is enabled regardless of the content of the job queue 404.

Figure 6:
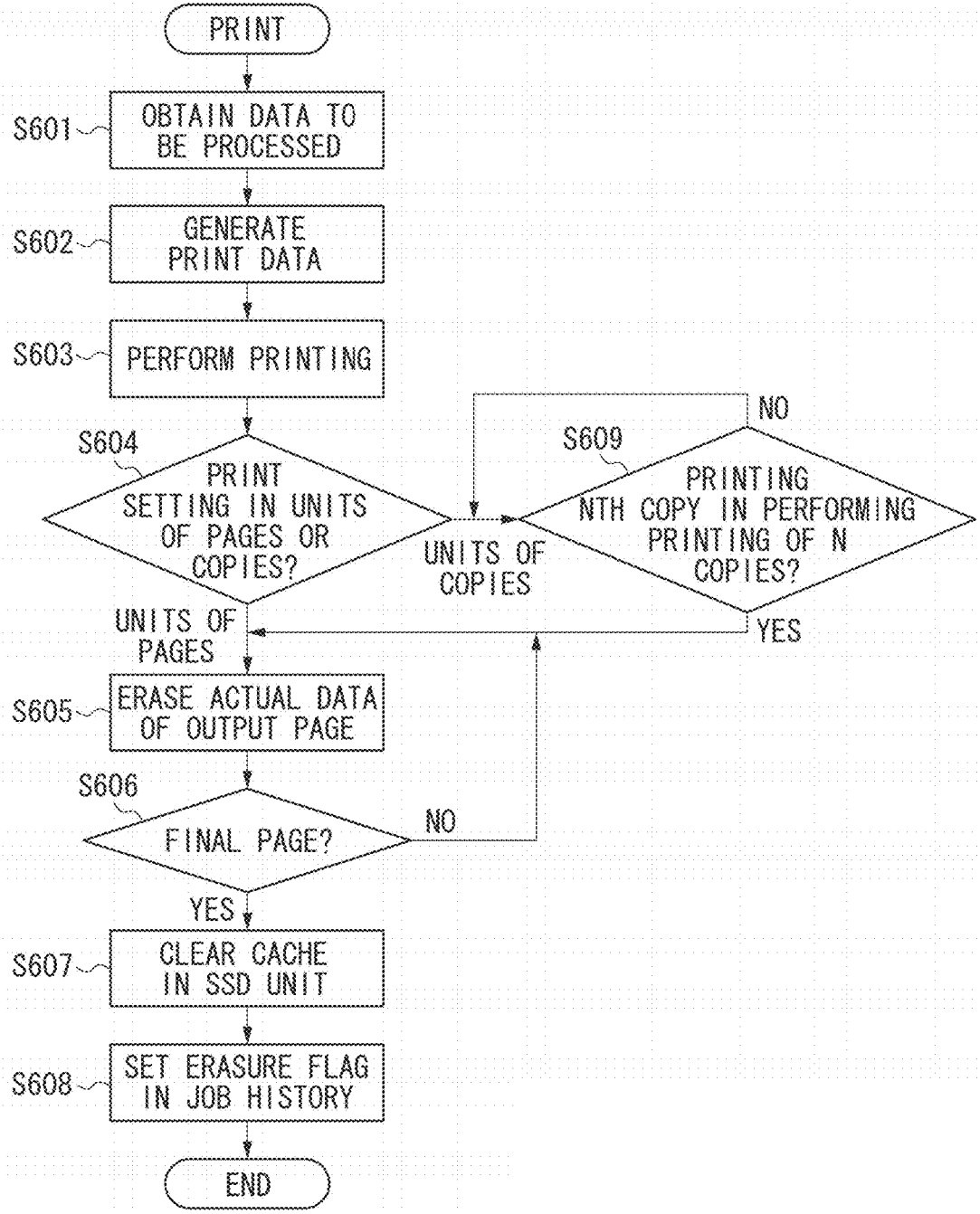
FIG. 6 is a flowchart illustrating a process for performing printing and data erasure according to a print setting.

FIG. 6 is a flowchart illustrating in detail the processing contents performed from data processing to erasure processing when the information processing apparatus 200 executes the print job requiring the overwrite erasure.

In step S601, the renderer 405 obtains process target data based on the job to be processed. In step S602, the renderer 405 expands and stores the print data in a predetermined location in the acquired storage area. If the engine unit 406 is ready, the renderer 405 then outputs the print data to the engine unit 406 in page units.

In step S603, the engine unit 406 performs printing based on the print data received in page units.

In step S604, the renderer 405 determines whether the print setting of the job to be processed is in page units or copy units. For example, if the print setting is in page units and two copies of the text including three pages are to be printed, printing is performed in the order of "first page, first page, second page, second page, third page, and third page". If the print setting is in copy units, printing is performed in the order of "first page, second page, third page, first page, second page, and third page".

If the renderer 405 determines that the print setting is in page units (PAGE UNITS in step S604), the process proceeds to step S605. In step S605, the renderer 604 outputs the first page twice to the engine unit 406. The renderer 405 then instructs the erasure unit 403 to overwrite and erase the storage location of the print data corresponding to the first page. The erasure unit 403 uses the processor core 214 and overwrites the storage location of the print data of the first page with the fixed value or the random value. If the renderer 405 determines that the print setting is in copy units (COPY UNITS in step S604), the renderer 405 stands by until the final copy has been printed, and then proceeds to step S605 and step S606.

In step S606, the renderer 405 determines whether only the final page remains to be output to the engine unit 406. If the final page has not been reached (NO in step S606), the renderer 405 performs the process of step S605 until the final page is reached.

If the final page is reached (YES in step S606), the process proceeds to step S607. In step S607, the processor core 214 clears the cache memory 219 in the SSD unit 207. However, the processor core 214 does not clear and protects read data in the cache memory 219 which has been stored prior to restriction of task switching in step S502.

In step S608, the job management unit 401 performs the following process on the target job about which the process of step S605 has been executed for all pages. An erasure flag indicating that the erasure processing has been performed is stored in the SSD unit 207 as job history, associated with the identification information indicating the job to be processed.

If the renderer 405 determines that the print setting is in copy units in step S604, the process proceeds to step S609. In step S609, the renderer 405 performs self-transition until the final copy (i.e., an Nth copy) is printed. If printing of the final copy is started (YES in step S609), the process proceeds to step S605. Since the processes to be performed thereafter are similar to those performed in the case where the print setting is in page units, description will be omitted.

The data processing performed when the information processing apparatus 200 transmits scanned content to an external terminal will be described below with reference to the flowchart illustrated in FIG. 8, as a different process of step S103 of the flowchart illustrated in FIG. 1.

In step S801, the scanner 210 scans a read target document and stores in the DRAM 202 the read scan data using the sensor. In step S802, the image processing unit 208 converts the scan data stored in the DRAM 202 into transmission data (e.g., a portable document file (PDF) document or joint photographic experts group (JPEG) document) and stores the data in the SSD unit 207. In step S803, the IF 205 transmits the transmission data stored in the SSD unit 207 to the external device of the address designated by the user. After receiving a reception completion notification from the external device at the designated address, or standing by for a predetermined time, the process ends. If there is a retransmission request from the external device at the designated address within the predetermined time, the data may be retransmitted.

Thereafter, the process target data and the transmit target data are overwritten in step S105 similar to when performing printing. When performing scanning, the scan data stored in the DRAM 202 and the transmission data stored in the SSD unit 207 are the process target data. However, according to the present exemplary embodiment, since the scan data stored in the DRAM 202 is stored in the volatile storage area, it is not necessary to perform overwrite processing. If the scan data is also stored in the non-volatile storage area, it is preferable to perform overwrite in step S105.

<The Content of the Configuration Register>

The detailed content of the configuration register and the processes for cancelling and setting the distribution function will be described below with reference to FIG. 3.

Figure 3:
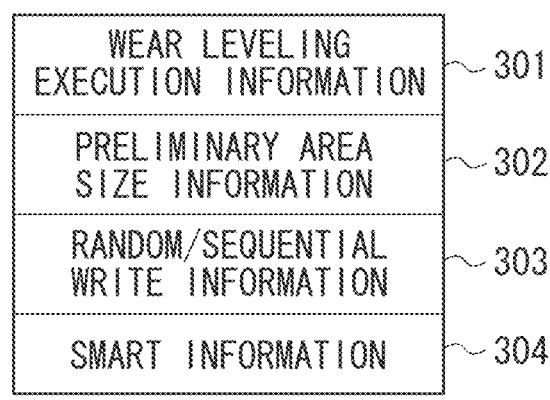
FIG. 3 is a schematic diagram illustrating information stored in a configuration register.

Referring to FIG. 3, wear leveling execution information 301 indicates whether the wear leveling is to be executed with respect to writing on the non-volatile memory 216 performed via the IF 215. Preliminary area size information 302 indicates a size (i.e., capacity and percentage) of the area not accessible from outside the SSD unit 207. When the wear leveling is executed, the preliminary area is exchanged with the area accessible by the user, so that the preliminary area is also referred to as over provisioning. For example, if the preliminary area is 50%, apparent storage capacity becomes approximately half of capacity compared to when the preliminary area is 0%. However, the longevity of the halved storage capacity becomes twice when the preliminary area is 0%. Further, the area set as the preliminary area is guaranteed to be a free space. As a result, write amplification (i.e., a phenomenon in which the write information in the non-volatile memory 216 becomes greater than actually written information due to garbage collection and the wear leveling) in the SSD unit 207 is reduced.

Random/sequential write information 303 indicates how writing is to be performed in and outside of the block when the IF 215 writes data in the non-volatile memory 216. For example, if "sequential write (i.e., sequential access)" is indicated for writing inside the block, each page in the block is written in the sequential order from the smallest page number. On the other hand, if "random write (i.e., random access)" is indicated, each page within the block is written at random. Similarly, if "sequential write (i.e., sequential access)" is indicated for writing outside of the block, each physical block is written in the sequential order from the smallest physical address (i.e., physical block number). If "random write (i.e., random access)" is indicated, each physical block is written at random. Further, leveling processing of the writing frequency can be individually set within the block and between the blocks.

SMART information 304 includes a return value with respect to a SMART command issued by the CPU 201. SMART is a self diagnosis function included in the device. More specifically, the function enables the CPU 201 to diagnose the SSD unit 207 when the SSD unit 207 provides information about set examination items to the CPU 201.

The examination items of SMART includes a read error occurrence rate in the non-volatile memory 216, a throughput of the SSD unit 207, the number of blocks in the preliminary area, the number of blocks having been written in the SSD unit 207, and the number of blocks having been read from the SSD unit 207. The information related to such items will be referred to as the SMART information for realizing the SMART function.

The contents of the configuration register may be changed by the CPU 201 instructing the processor core 214 to that effect.

Further, the information indicating a plurality of wear leveling protocol types may be stored as the wear leveling execution information 301. In such a case, "wear leveling enabled" may be treated as one type of the protocol. The wear leveling protocol includes the protocol for performing control to write data in the page of low write frequency of the block to be accessed according to an instruction, and the protocol for controlling sequentially the writing in a free block of low write frequency.

Furthermore, according to the present exemplary embodiment, the write distribution is realized using the program for ease of description. However, a hard wired logic may be included in the IF 215 separately from the processor core 214 and realize a portion of distribution processing.

An example of changing the register setting when enabling or disabling the distribution function, will be described below.

The value of the register group is initialized as the fixed values along with the activation of the SSD unit 207. The CPU 201 then instructs the processor core 214 to change the values of the register group 217 and set the wear leveling.

For example, if the wear leveling is to be set, the CPU 201 controls the processor core 214 to write the values "1, 20, 1" as the wear leveling execution information 301, the preliminary area size information 302, and the random/sequential write information 303 in the register group 217. The first value "1" indicates that the wear leveling is to be performed, and the second value "20" indicates that 20% of the logic address is to be disabled (i.e., disabled in a logic table) and 20% preliminary area is to be obtained. The third value "1" indicates that random write access is to be performed. Since the SMART information 304 is not written from the CPU 201, description will be omitted.

On the other hand, if the wear leveling is to be disabled, the CPU 201 controls the processor core 214 so that the values "0, 0, 0" are written as the wear leveling execution information 301, the preliminary area size information 302, and the random/sequential write information 303 in the register group 217. The first "0" indicates that the wear leveling is not to be performed, and the second "0" indicates that the preliminary area is to be 0%. The third "0" indicates that the sequential write access is to be performed. If a level of the distribution function is only to be lowered, it may be only necessary to set "0" to the wear leveling execution information 301 and the preliminary area size information 302.

The UI of the user terminal for executing printing according to the present exemplary embodiment will be described below with reference to FIGS. 9A and 9B.

Figure 9A:
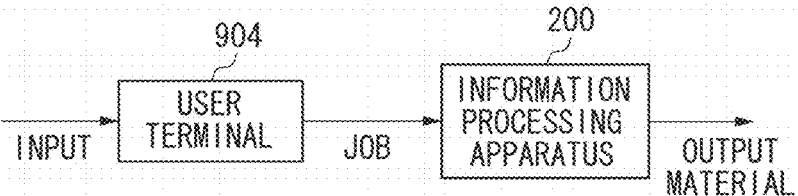
FIGS. 9A and 9B are schematic diagrams illustrating a system configuration for printing from a user terminal and a user interface (UI) of the user terminal used when instructing printing from the user terminal.

Referring to FIG. 9A, a user terminal 904 (i.e., the information processing terminal) is configured similar to the information processing apparatus 200 illustrated in FIG. 2 (without the scanner 210 and the print engine 211). The user terminal 904 includes the display device, the keyboard, and the mouse as the UI 203.

Upon selecting a file in the user terminal 904 or on a network as the file to be printed, the user uses the UI 203 of the user terminal 904 and sets the details of the print job to be input into the information processing apparatus 200.

Figure 9B:
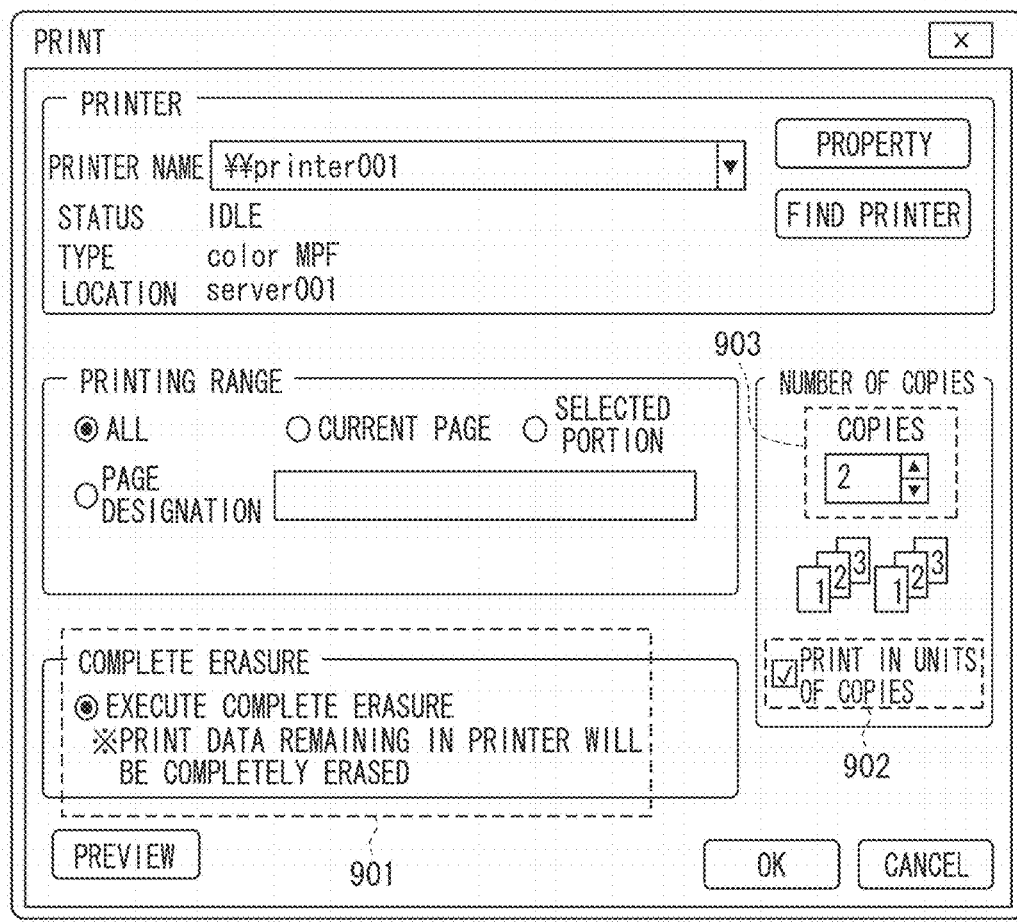

FIG. 9B illustrates a screen displayed on the display device of the UI 203 of the user terminal 904. Referring to FIG. 9B, a dotted line frame 901 indicates an area for setting whether to perform complete erasure. The complete erasure is the overwrite erasure of the data remaining in the job queue 404 and the renderer 405 of the information processing apparatus 200 related to the job. A dotted line frame 902 indicates the area for selecting whether to print in copy units or in page units, and a dotted line frame 903 indicates the area for selecting the number of copies to be printed.

The process will be described below with reference to FIGS. 10A and 10B in which the user makes an operation on the UI 203 of the information processing apparatus 200 to newly set the job, or to make further setting to the job input from outside, such as from the user terminal 904.

Referring to FIGS. 10A and 10B, an indicator 1001 indicates whether the complete erasure is set for each job. For example, if the user touches the indicator 1001, a complete erasure setting becomes effective and the indicator 1001 is inverted. A check box 1002 indicates whether printing of the job is selected. For example, if the user touches the check box 1002, the corresponding job becomes effective as the job to be printed and the box 1002 becomes checked. A row 1003 indicates properties (i.e., a text name, the print setting, the number of pages and copies, and a file size) of each job. For example, the job having the text name "Document_004.pdf" illustrated in FIG. 10A is to be printed in monochrome on an A4 size medium by assigning 1 page to each of both sides of the medium. Further, the job indicated in the row 1003 is selected as the job to be printed and to be completely erased. A button 1004 is a button for cancelling the job selected as the job to be printed. A button

1005 is a button for deleting the job selected to be printed. A button 1006 is a button for starting printing or the complete erasure.

The data is not completely erased even if the button 1005 is pressed to delete the job. If the data is to be completely erased without printing, it is only necessary to inverse the display 1001 indicating the complete erasure as illustrated in FIG. 10B. In such a case, the buttons 1004 and 1005 become ineffective, and the display of the button 1006 is changed.

The process in which the user operates on the UI 203 of the information processing apparatus 200 and sets document scanning will be described below with reference to FIG. 11.

Figure 11:
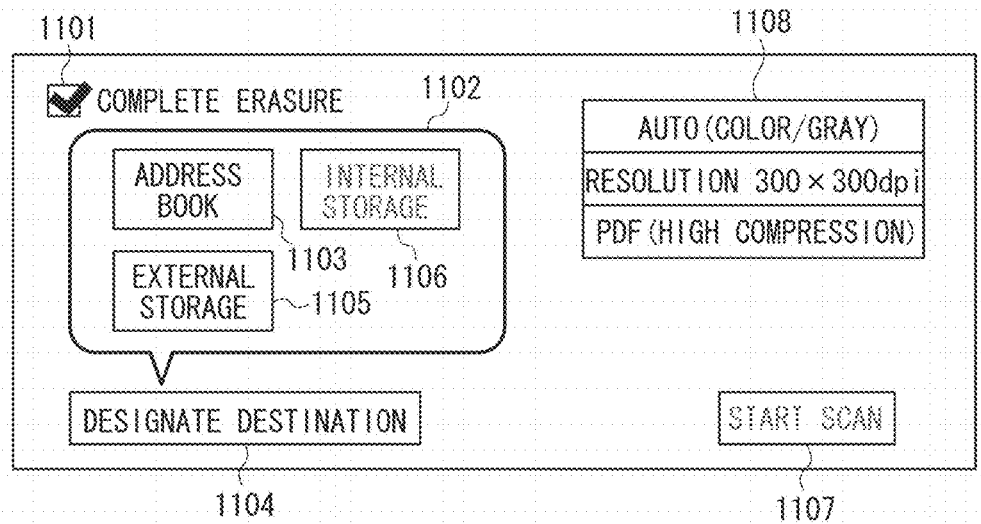
FIG. 11 is a schematic diagram illustrating the UI for setting scan processing.

Referring to FIG. 11, a check box 1101 is a box for making a setting to overwrite the scan data remaining in the information processing apparatus 200. If the user touches the check box 1101 and the check mark is displayed, the setting becomes effective. A button 1104 is a button for designating the destination address, and if the user presses the button 1104, a setting window 1102 in which buttons 1103, 1105, and 1106 are arranged is opened. The button 1103 is a button for referring to an address book and setting a transmission destination. The button 1105 is a button for setting an external storage as a storing destination. The button 1106 is a button for setting the transmission destination (i.e., the storing destination), from a folder in an internal storage of the information processing apparatus 200. An example of the external storage is portable media (e.g., a USB flash memory) which is connected to the IF 205 via the USB. Further, a portion of the storage area of the SSD unit 207 is provided as the internal storage. Since the complete erasure has become effective by the user checking the check box 1101 in the screen illustrated in FIG. 11, it is not preferable to store the data in the information processing apparatus 200. Therefore, the button 1106 (i.e., a unit for receiving the instruction of storing the data inside the information processing apparatus 200) is ineffective and cannot be selected.

A property display area 1108 is an area for setting scan processing. If the user touches the property display area 1108, a plurality of setting items is displayed in a pull-down format, and the user selects the desired items. According to the display illustrated in FIG. 11, an automatic determination mode is selected, i.e., whether to generate a color image or a gray scale image as a scan image is determined based on the document. Further, a scan resolution is set to 300×300 dpi, and a file format of the scan image to be generated is high-compression PDF.

As described above, according to the present exemplary embodiment, the setting of the writing distribution function with respect to the non-volatile memory in the information processing apparatus 200 is changed based on the job input to the information processing apparatus 200. The timing is then determined based on the processed state (e.g., cancelled, transmission completed, or conversion completed) of the job performed by the information processing apparatus 200, and the overwrite erasure is performed. As a result, the overwrite erasure can be more easily performed on the data as to the job requiring secure processing with a simple configuration.

According to the above-described exemplary embodiment, the task switching is restricted in step S502 of the flowchart illustrated in FIG. 5 so that other jobs which do not require secure processing are prevented from being performed in parallel. However, the restriction on the task switching may be cancelled in consideration of processing efficiency of the jobs which do not require secure processing. For example, other scan processing may be executable while performing a print job requiring secure processing.

A second exemplary embodiment of the present invention will be described below. According to the first exemplary embodiment, the user inputting the process target job into the information processing apparatus 200 has set the complete erasure. According to the second exemplary embodiment, the user specifying environmental settings of the information processing apparatus 200 (hereinafter referred to as an administrator) sets the complete erasure. The configurations and the steps having similar functions to the first exemplary embodiment will be assigned the same reference numbers and description thereof will be omitted.

Figure 12A:
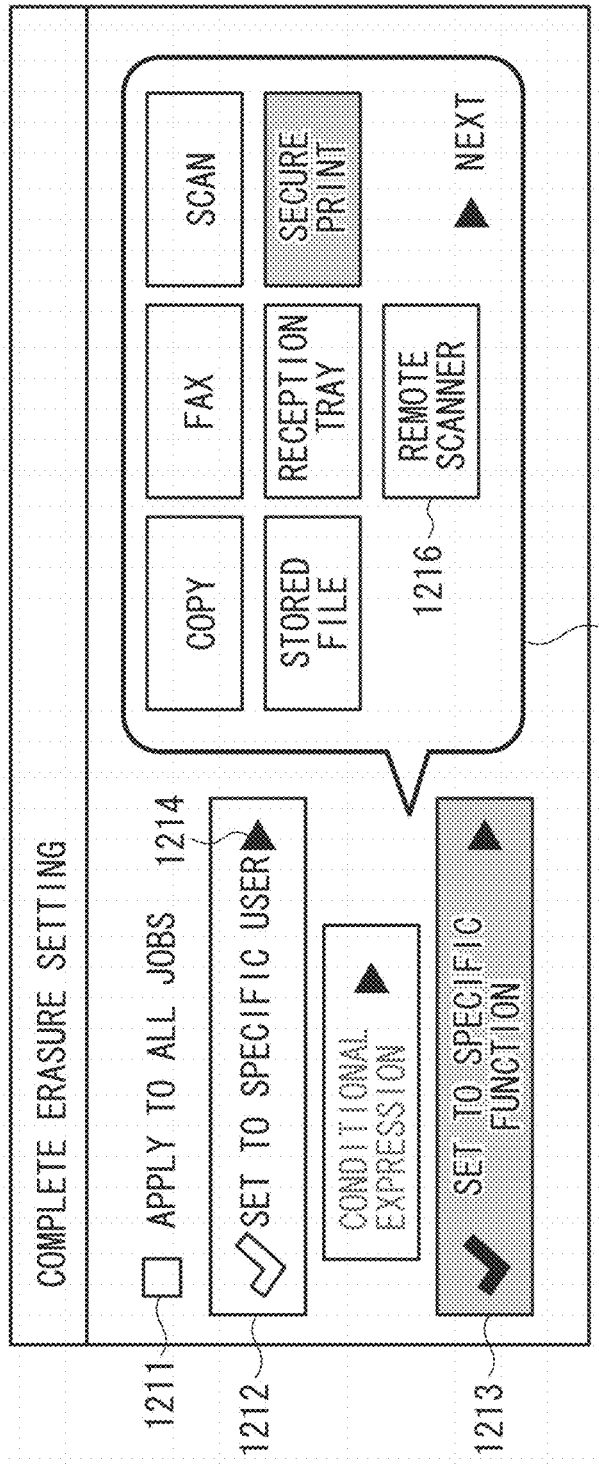
FIGS. 12A and 12B are schematic diagrams illustrating the UI for setting complete erasure in the information processing apparatus.

FIG. 12A illustrates the UI used by the administrator to set the complete erasure to the information processing apparatus 200.

Referring to FIG. 12A, a check box 1211 is a box for setting the complete erasure to the data remaining in the information processing apparatus 200 for all jobs on which the complete erasure is executable. A button 1212 indicates a condition of an effective range of the setting. In the example illustrated in FIG. 12A, the button 1212 indicates "set to specific user" or "set to specific function". A check mark 1213 indicates whether the condition of the button 1212 is effective. In the example illustrated in FIG. 12A, the check mark 1213 indicates that "set to specific function" is effective. A button 1214 is a button for setting the details of the condition indicated by the button 1212, and if the user touches the button 1214, a setting window 1215 is displayed. The setting window 1215 displays a plurality of setting items 1216, and the user selects the function by which the complete erasure is enabled. In the example illustrated in FIG. 12A, "secure print" is selected.

The functions which have not been described according to the first exemplary embodiment will be described below. "Stored file" is a function of using the file stored in the information processing apparatus 200 to perform printing, and the file may be printed a number of times as necessary. "Reception tray" is a folder for temporarily storing the file the information processing apparatus 200 has received by facsimile. The file is printed from this folder.

"Secure print" is the function of suspending printing until the user has performed direct personal authentication on the information processing apparatus 200 even if the print job has been input from the user terminal. The direct personal authentication is performed by causing the user to input a password in the UI 203 of the information processing apparatus 200 or insert an identification (ID) card in a card reader (not illustrated) of the information processing apparatus 200. "Remote scanner" is a function of storing the scan image in the information processing apparatus 200 using the scanner on the user terminal side or causing the information processing apparatus 200 to print the scan image.

Figure 12B:
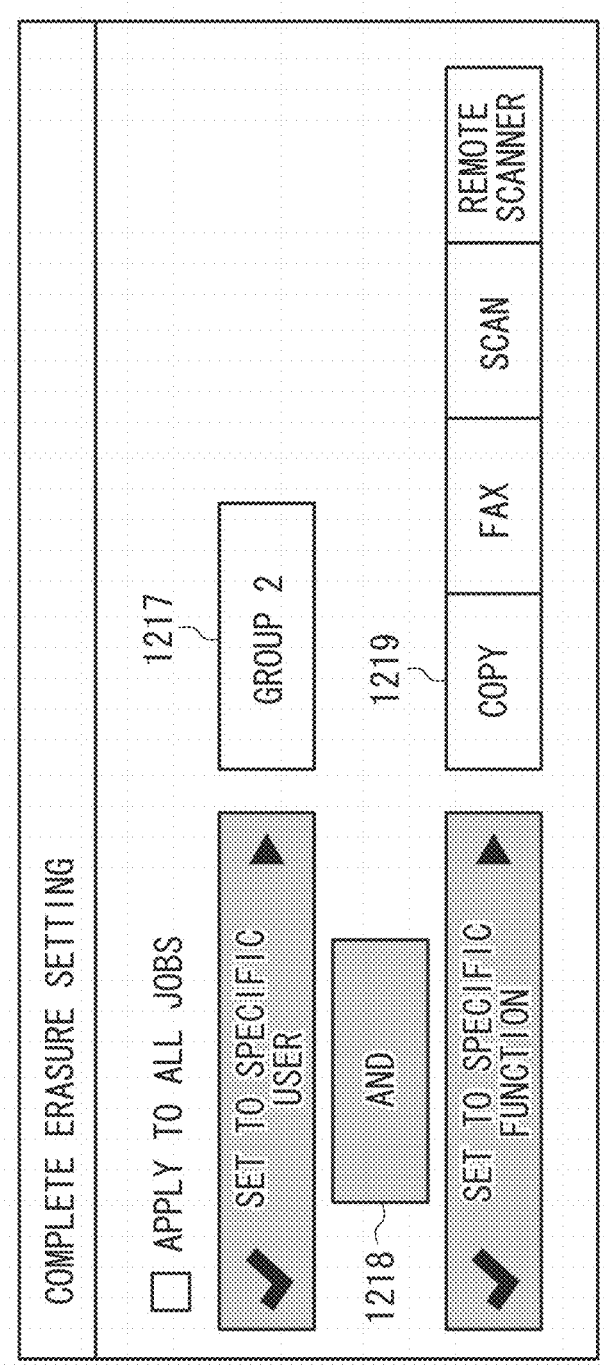

FIG. 12B illustrates an example of the screen to which the complete erasure has been set. Referring to FIG. 12B, a button 1218 is a button for selecting a logical expression (e.g., AND and OR) when a plurality of conditions 1212 has been selected. A box 1217 indicates the content set in more detail to the condition "set to specific user". Boxes 1219 indicate the contents set in more detail to the condition "set to specific function".

In the example illustrated in FIG. 12B, "AND" is selected in the button 1218. The complete erasure is thus executed when "copy", "facsimile", "scan", and "remote scanner" functions are performed for one or more users belonging to group 2.

As described above, according to the present exemplary embodiment, the administrator collectively sets the conditions for completely erasing the job. It thus becomes unnecessary to set the complete erasure each time individual users input the jobs, so that user-friendliness is improved as compared to singularly performing the first exemplary embodiment.

Further, according to the second exemplary embodiment, if "apply to all jobs" is to be set, a mode of the information processing apparatus 200 may be switched to disabling the distribution function. Furthermore, it is also possible to combine the first exemplary embodiments with second exemplary embodiments.

Moreover, according to the above-exemplary embodiments, the overwrite erasure is performed after the process has been completed, for ease of description. However, the instruction for job cancel may be treated as an interruption, and the overwrite erasure may be performed in response to the interruption for job cancel. In such a case, it is preferable to overwrite the area (i.e., a reservation area) reserved for storing the derivative print data and transmission data derivatively generated from the process target data, in addition to the process target data.

Further, according to the above-exemplary embodiments, the writing distribution function is disabled in response to input of the job. However, the writing distribution function may be disabled immediately before performing the overwrite erasure.

Furthermore, according to the above-exemplary embodiments, description about the predetermined value used for overwriting the data has been omitted. The CPU 201 may notify the SSD 207 of the predetermined value used for overwriting the data by issuing an Advanced Technology Attachment (ATA)-standardized TRIM command and notifying that the predetermined value used for overwriting the data is a disabled value. A Small Computer System Interface (SCSI)-standardized TRIM command is a WRITE SAME command with UNMAP setting or an UNMAP command.

Moreover, if a file system of an operating system (OS) is fourth extended file system (ext4), the CPU 201 may issue a discard command.

Further, when the SSD unit 207 is to perform reclamation (also referred to as the garbage collection) on the predetermined value used for overwriting, the area may be initialized to a writable state.

Furthermore, according to the above-described exemplary embodiments, the job is input from the external user terminal which is installed outside the information processing apparatus 200 with reference to FIGS. 9A and 9B. However, if the user makes an instruction to perform the complete erasure on the dotted line frame 901, the user terminal 904 may switch the mode of the information processing apparatus 200. More specifically, the user terminal 904 issues a mode switching instruction from the CPU 201, i.e., an instruction unit, to disable the writing distribution function of the information processing apparatus 200 before transmitting the job. The user terminal 904 transmits the job after receiving a response from the information processing apparatus 200 that the mode has been switched. The control unit 402 in the information processing apparatus 200 then disables the distribution function based on the instruction from the information processing terminal 904. As a result, execution of the writing distribution is reduced also with respect to the jobs present in the spooler, so that the overwrite erasure becomes easier to perform.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-084718 filed Apr. 16, 2014, which is hereby incorporated by reference herein in its entirety.

What is claimed is:

1. An information processing apparatus comprising:
a receiving unit configured to receive a job;
a non-volatile memory storing data related to the job received by the receiving unit;
a control unit configured to invalidate, if the job is a secure job, a writing distribution function of distributing writing on the non-volatile memory before performing data processing based on the job, which is not erasure processing, and validate the writing distribution function after the erasure processing;
a processing unit configured to perform data processing based on the job in priority to other jobs, if the job is a secure job; and
an erasure unit configured to perform, based on a processing state of the job processed by the processing unit, the erasure processing by writing a predetermined value in an area storing data related to the job.

2. The information processing apparatus according to claim 1, further comprising a setting storage unit configured to store the setting of the writing distribution function,
wherein the control unit changes the setting of the writing distribution function by accessing the setting storage unit.

3. The information processing apparatus according to claim 1, wherein the distribution writing function is wear leveling with respect to writing on the non-volatile memory, and the control unit disables the wear leveling.

4. The information processing apparatus according to claim 1, wherein the writing distribution function is a function of randomly accessing the non-volatile memory, and the control unit changes the random access to sequential access to disable the writing distribution function.

5. The information processing apparatus according to claim 1, wherein the writing distribution function is a function of setting a preliminary area in which a logical address is disabled on the non-volatile memory, and
the control unit changes and decreases the preliminary area to disable the distribution writing function.

6. The information processing apparatus according to claim 1, wherein the processing unit rasterizes process target data to become print data, and the erasure unit erases the process target data and the print data in response to outputting of the print data.

7. The information processing apparatus according to claim 1, wherein the processing unit converts process target data stored in a volatile memory to transmission data and stores the transmission data in the non-volatile memory, and the erasure unit erases the transmission data after the transmission data is completely transmitted.

8. The information processing apparatus according to claim 1, wherein the control unit enables the distribution writing function in response to completion of writing the predetermined value by the erasure unit.

9. The information processing apparatus according to claim 1, wherein the erasure unit erases process target data according to an instruction for cancelling the job.

10. The information processing apparatus according to claim 1, wherein the erasure unit performs writing processing, according to an instruction for cancelling the job, on a reservation area for storing data derivatively generated from the process target data.

11. The information processing apparatus according to claim 1, further comprising:
a queue capable of holding one or more jobs; and
a management unit configured to determine a job to be processed by the processing unit from jobs held in the queue,
wherein the control unit determines whether to change the writing distribution function according to whether a job exists in the queue which the erasure unit needs to erase.

12. The information processing apparatus according to claim 1, further comprising a print engine,
wherein the erasure unit controls timing of erasure processing based on a print setting change made to the job.

13. The information processing apparatus according to claim 1, wherein the job stores information for identifying the data to be processed by the processing unit, or process target data, and information for specifying a processing content to be performed by the processing unit.

14. The information processing apparatus according to claim 1, further comprising a user interface,
wherein, in a case where the erasure unit receives an instruction from a user to perform the erasure processing, a receiving unit for designating information about the job is disabled.

15. An information processing method performed by an information processing apparatus, the method comprising:
receiving a job;
storing, in a non-volatile memory, related to the job received by the receiving unit;
invalidating, if the job is a secure job, a writing distribution function of distributing writing on the non-volatile memory before performing data processing based the job, which is not erasure processing, and validating the writing distribution function after the erasure processing;
performing data processing based on the job in priority to other jobs; and
performing, based on a state of data processing based on the job, erasure processing by writing a predetermined value in an area storing data related to the job.

16. A non-transitory storage medium storing a program causing a computer to execute an information processing method performed by an information processing apparatus, the method comprising:
receiving a job;
storing, in a non-volatile memory, data related to the job received by the receiving unit;
invalidating, if the job is a secure job, a writing distribution function of distributing writing on the non-volatile memory before performing data processing based the job, which is not erasure processing, and validating the writing distribution function after the erasure processing;
performing data processing based on the job in priority to other jobs; and
performing, based on a state of data processing based on the job, erasure processing by writing a predetermined value in an area storing data related to the job.

* * * * *